Jan. 6, 1942. G. FREUDENBERG ET AL Re. 21,994

METHOD OF HAIR WAVING

Original Filed Feb. 3, 1936 8 Sheets-Sheet 1

INVENTORS
GOTTHARD FREUDENBERG
ALFRED E. REIMERS
BY
Richards & Geier
ATTORNEYS

METHOD OF HAIR WAVING

Original Filed Feb. 3, 1936 8 Sheets-Sheet 2

INVENTORS
GOTTHARD FREUDENBERG
ALFRED E. REIMERS
BY Richards & Geier
ATTORNEYS

METHOD OF HAIR WAVING

Original Filed Feb. 3, 1936 8 Sheets-Sheet 3

INVENTORS
G. FREUDENBERG
A. E. REIMERS
BY
Richards & Geier
ATTORNEYS

Jan. 6, 1942. G. FREUDENBERG ET AL Re. 21,994

METHOD OF HAIR WAVING

Original Filed Feb. 3, 1936 8 Sheets-Sheet 4

INVENTORS
GOTTHARD FREUDENBERG
ALFRED E. REIMERS
BY Richards & Geier
ATTORNEYS

Jan. 6, 1942. G. FREUDENBERG ET AL Re. 21,994

METHOD OF HAIR WAVING

Original Filed Feb. 3, 1936 8 Sheets-Sheet 5

INVENTORS
G. FREUDENBERG
A. E. REIMERS
Richards & Geier
ATTORNEYS

Jan. 6, 1942. G. FREUDENBERG ET AL Re. 21,994

METHOD OF HAIR WAVING

Original Filed Feb. 3, 1936 8 Sheets-Sheet 6

INVENTORS
GOTTHARD FREUDENBERG
ALFRED E. REIMERS
BY
Richards & Geier
ATTORNEYS

Jan. 6, 1942. G. FREUDENBERG ET AL Re. 21,994

METHOD OF HAIR WAVING

Original Filed Feb. 3, 1936 8 Sheets-Sheet 7

INVENTORS
GOTTHARD FREUDENBERG
ALFRED E. REIMERS
BY
Richards & Geier
ATTORNEYS

Jan. 6, 1942. G. FREUDENBERG ET AL Re. 21,994

METHOD OF HAIR WAVING

Original Filed Feb. 3, 1936 8 Sheets-Sheet 8

INVENTORS
GOTTHARD FREUDENBERG
ALFRED E. REIMERS

BY Richards & Geier
ATTORNEYS

Reissued Jan. 6, 1942

Re. 21,994

UNITED STATES PATENT OFFICE 21,994

METHOD OF HAIR WAVING

Gotthard Freudenberg, Hermsdorf, Berlin, Germany, and Alfred Edmund Reimers, Harrington Park, N. J., assignors to The Nestle-Lemur Company, New York, N. Y., a corporation of Ohio Original No. 2,108,963, dated February 22, 1938, Serial No. 62,094, February 3, 1936. Application for reissue March 28, 1941, Serial No. 385,700

28 Claims. (Cl. 132—36)

The present invention relates to a method and mechanical system for hair waving.

Although the present invention has broad application to methods of hair waving generally where the hair is submitted to the influence of heat to cause it to take on permanent wave characteristics, the present invention, however, will be illustratively described in connection with the processes of Croquignole hair waving.

In methods of Croquignole hair waving in use up to the present time, it was customary to block off the hair on the woman's head in squares or small areas and to gather the strand of hair from each area into a strand which strand was clamped closely adjacent to the scalp by means of a clamping device.

The end of the strand was wound up on the curling rod until the curling rod reached the clamp whereupon the curling rod was fitted into pivotal mounts in the clamp and was tightened up by a key and cooperating ratchet combination on the clamp and curling rod.

After the coil of hair had been suitably clamped and placed on the curling rods as described, and after such curling rods had been placed upon the clamp and tightened, a small pad having a felt or fabric face moistened with a suitable solution with an impermeable foil and/or paper backing outwardly was placed on the hair coil.

The pad was then clamped into position by an electrical heating device consisting of two elongated semicircular jaw elements which were spring pressed together and which were provided with electrical resistance heating units, each of the clamps being preferably connected by insulated wires to a hair waving machine having suitable electrical connections or electrical controls and enabling control of the heating effect of the heating devices or heaters.

In this process of hair waving the heat applied by the heating clamp to the pad and to the curl of hair inside would gradually increase over a period of time until the treatment has been completed.

Moreover, with processes of the character just described, it was not possible readily to control the amount of heat applied and the amount of heat tended to increase toward the end of the treating process before the heaters were removed with the result that the temperature applied to the hair inside the hair waving pad would rapidly increase particularly when too little solution was applied and after all the moisture had been evaporated.

In addition, the large number of wires which hang down from the hair waving machine or hair waving head to the various heaters positioned above the clamps of or around the head of the woman whose hair was being waved not only gave the woman a sense of being encaged and being subjected to some unpleasant operation, and in addition, caused the person whose hair was being waved to remain in substantially fixed position without being able to move about, read or indulge in other recreation.

The process also took considerable time, usually requiring a preheating period of 3½ minutes, a heating and steaming period of 5 minutes and a cooling period of 5 minutes, a total of about 13½ minutes before the heaters could be removed.

Other methods of hair waving have also been suggested in which the hair waving machine and the large number of wires extending down to the head of the customer had been eliminated, which involved the utilization of pads or pouches filled with dry chemicals. These pouches upon being moistened would heat up due to inter-reaction of the chemicals and cause a heating of the hair. However, the amount and control of the heat in this type of pad was not satisfactory and the chemical material, although carefully prepared and graded, would nevertheless give uneven effects.

In addition, the pads would be subjected to the action of the atmosphere, moisture, and temperature before being applied to the hair and this also would cause a substantial variation in the heating powers of the pad.

It is one of the objects of the present invention to provide an improved process of hair waving and particularly Croquignole hair waving in which the customer would not be constrained or caused to remain in fixed position without being able to move her head freely, which will eliminate the necessity of having a large number of wires extending down from the machine to the head of the customer, and which at the same time, permit an accurate and careful control of the heat applied to the hair, and which further would substantially shorten the period during which the heaters are applied to the hair and the time required to complete the permanent wave.

With such a shorter waving operation, a greater burden is placed upon the operator since the time periods of the shorter heating operations become more critical and in addition the operator must function with greater rapidity and increased accuracy.

It is therefore a further object of the present invention to provide a heating arrangement which will enable a more accurate control of the amount of heat applied to the hair being curled and the temperature of the heaters when so applied, independent of the thought or judgment of the operator, which although it may be manually initiated into operation, will be automatically controlled to prevent over-heating or generation of excessive temperatures.

A still further object is to provide an improved hair waving system of the type described including mechanical and electrical arrangements in which the various elements of the mechanical and electrical arrangements to be used may be of an inexpensive and durable construction and may be more readily assembled, handled, repaired and replaced.

Other objects will be obvious or will appear during the course of the following specification.

In the preferred construction, the machine is provided with a plurality of heater rods, arranged in series or in groups, so that assurance will be had that the heaters will be elevated to the proper temperature, even though a considerable time elapse between the time that the first heater is placed upon the pad encircling the coiled hair and the last heater has been placed in position upon the hair coils of the same person or customer. Each rod may contain a resistance coil wound so as to assure a uniform distribution of heat therealong.

The hair heater or heater clamp which will hereafter be called the heater, preferably consists of two semi-circular clamping heat-storing members of a suitable magnesium alloy, devoid of resistance heating means, but which may be heated to a proper temperature when placed on the heating rods which are constructed so as to enable the heater to be placed thereon and which will insure a predetermined amount of heat being transmitted to and stored up in said heater.

It has been found desirable to provide a test rod to receive a plurality of heaters to enable a determination of the most satisfactory steaming period and also to provide a plurality of additional rods to receive and preheat the heaters employed during the hair waving operation.

Because of the speed of operation it has been found desirable not to heat all the heaters at one time, but just sufficient at a time so that when they have been elevated to proper temperature and the electrical current cut off, they may be conveniently all applied to the prepared hair coils before any of the heaters fall to too low a temperature.

To assume maximum accuracy and relieve the operator it is desirable to provide an automatically controlled, manually initiated electrical circuit arrangement which will cut off the current to the heating rods when the heaters have been raised to proper temperature and which will also indicate when the heaters have thereafter fallen to too low a temperature to be utilized.

This will avoid the possibility of the heaters overheating due to oversight on the part of the operator and also will relieve the necessity for the operator to calculate or set the heating time, as heretofore, and will further make it unnecessary for the operator to turn off the heating current when the heaters have been raised to proper temperature.

The preferred form of circuit for this purpose is a thermostatically controlled circuit with a main relay switch which will be thrown in to energize the heating rods upon manual actuation of the energizing circuit for the solenoid of the relay and which will be thrown out of operation to open the circuit by a thermostat, the heating coil of which may be connected in parallel with the resistance heater.

One type of signal may be provided to be illuminated when the main heating current is on and another type of signal may be provided to indicate when the heating rods and heaters thereon are still being maintained by proper temperature after the main heating current has been turned off.

In the preferred construction, the heating machine is so correlated in respect to the head of hair being treated that the heating machine is provided with a series of signals indicating to the operator the time at which the heaters may be applied to the hair and taken away from the hair.

By using the pre-heating arrangement, as above described, it is possible to decrease the waving period by half since with the method just described, the pre-heating takes place before the heaters are on the head for a period of 4½ minutes while the steaming period with the heaters on the head may be 2 minutes or less, after which the heaters are removed and replaced on the heating rods.

It has been found satisfactory to utilize a hair waving method or process in which the hair is clamped close to the roots and then coiled upon a curling rod and affixed with assurance that there will be as little space as possible between the coil of hair upon the curling rod and the scalp, the heater and the curling rod being adapted to cooperate in such a manner that the waving may be carried out very close or substantially adjacent to the scalp with a minimum space required for the clamping operation and for the pivotal mounting of the curling rod.

It was found desirable to form the hair waving pad of a triple layer construction, the inner layer being made of flannel or felt and the backing consisting of parchment paper which is pasted at the sides to the flannel. The foil constituting the intermediate layer, should preferably be loosely held between said paper and absorbent and be of sufficient thickness to retain its shape when bent over the coiled hair.

The above and other objects will appear more clearly from the following detailed description, which when taken in connection with the accompanying drawings, will illustrate preferred embodiments of the inventive idea.

Referring to the drawings.

Figure 8:
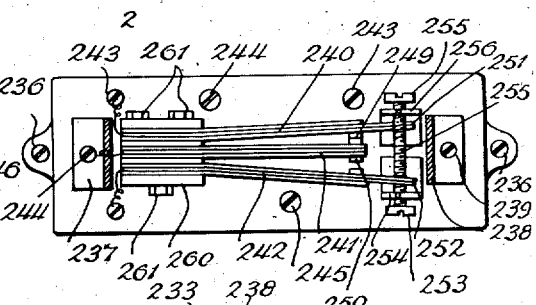
Figure 7:
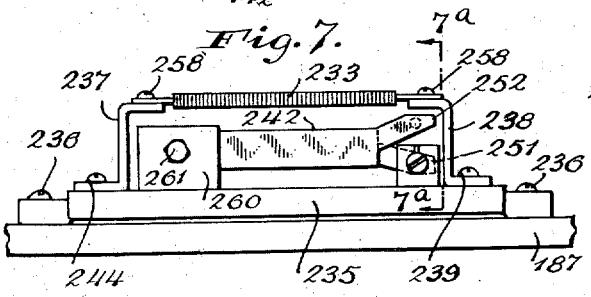
Figure 7A:
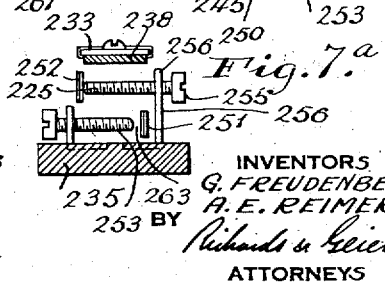

Figures 7, 7*a* and 8 show one form of thermostat, Figures 7 and 8 being respectively side elevational and top elevational views, the resistance heater being removed from the thermostat in Figure 8 and Figure 7a being a side sectional view upon the line 7a—7a of Figure 7.

Figure 9:
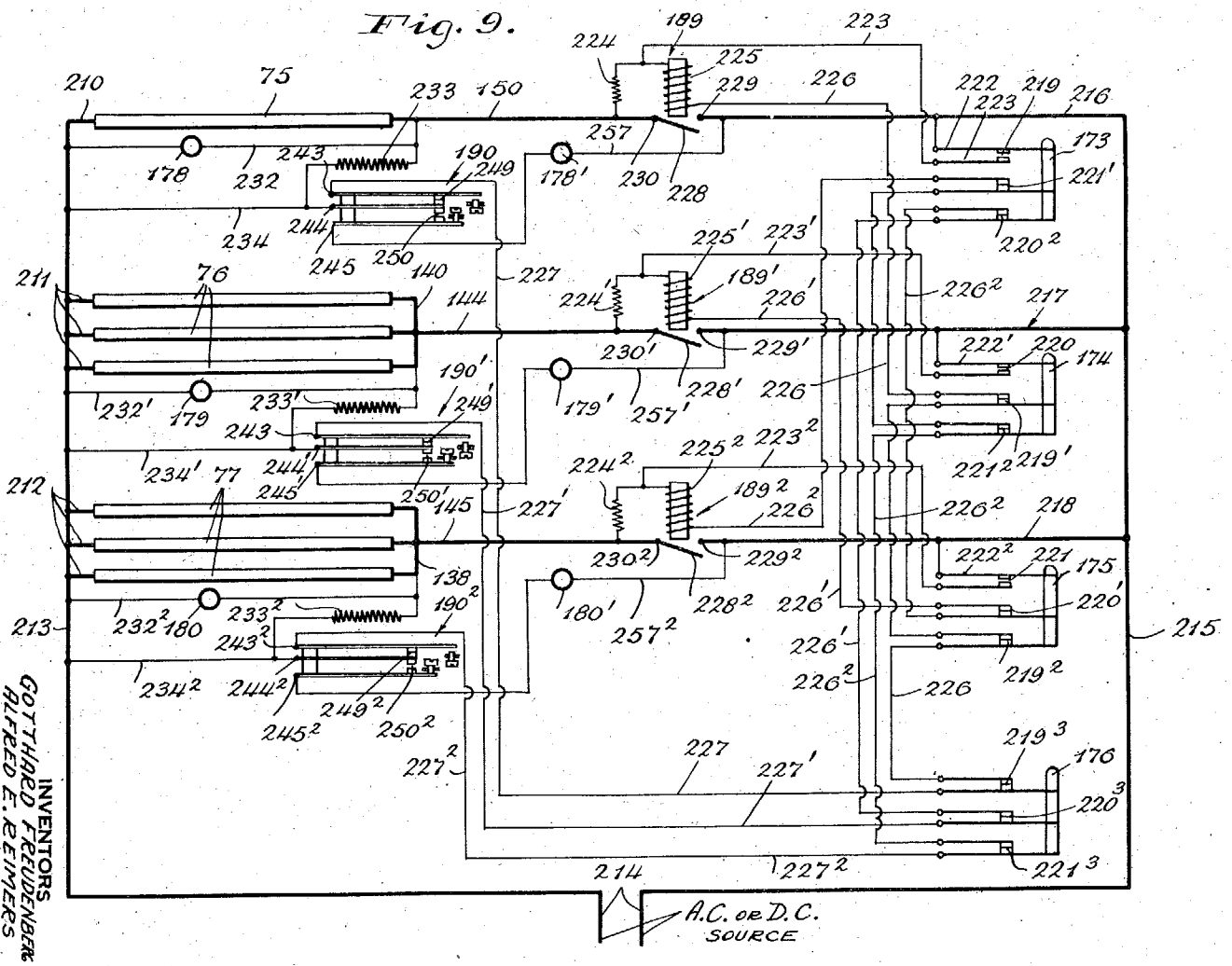
Figure 10:
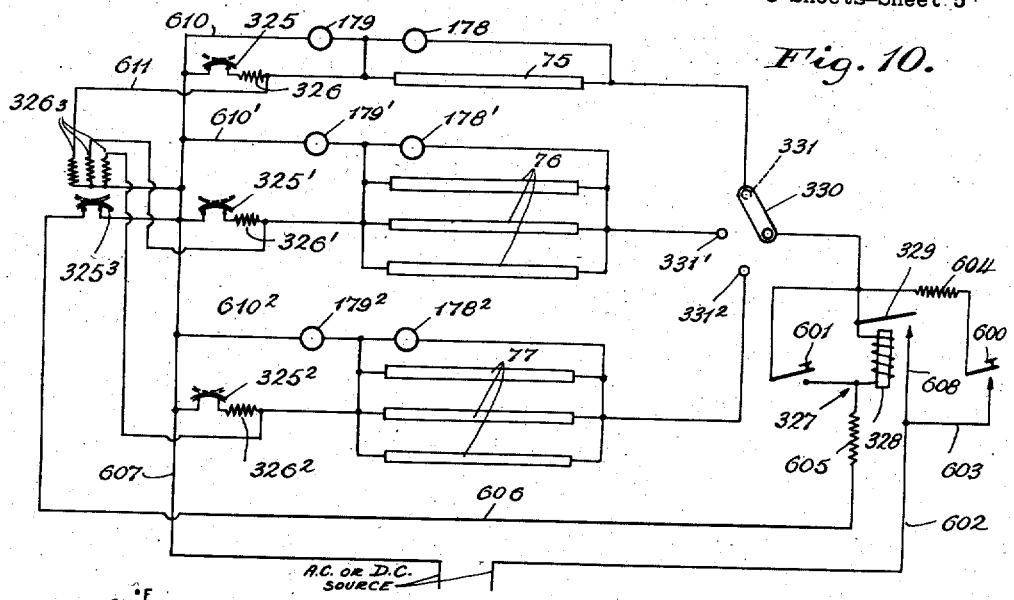

Figures 9 and 10 are alternative wiring diagrams illustrating the electrical connections to the heating rods and to the controls of Figures 1 to 8.

Figure 11:
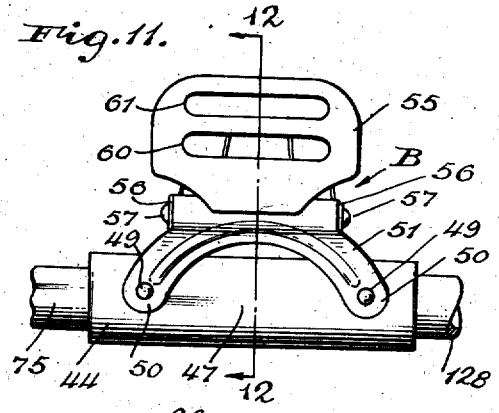
Figure 12:
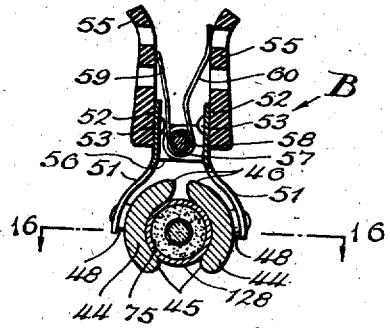

Figures 11 and 12 show the heater, Figure 11 being the side elevational view of the heater in position upon the heating rod and Figure 12 being a transverse sectional view on the line 12—12 of Figure 11, both being upon enlarged scale.

Figure 13:
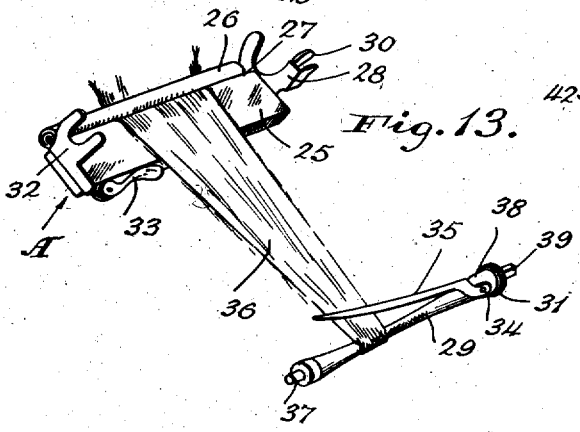

Figure 13 is a top perspective view illustrating how a strand of hair is wound upon the curling rod and then placed in position on the heater.

Figure 14:
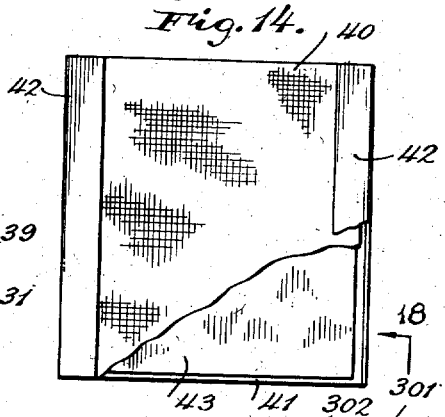

Figure 14 is an inside view of one form of hair waving pad which may be utilized to enclose the coil of hair upon the curling rod of Figure 13, part of the pad being broken away to show the intermediate layer of foil.

Figure 15:
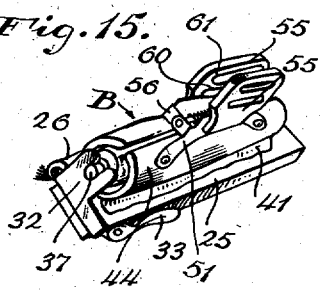

Figure 15 is a top perspective view illustrating how the heater of Figures 11 and 12 may be applied to the coil of hair upon the curling rod after the pad of Figure 14 has been placed thereon.

Figure 16:
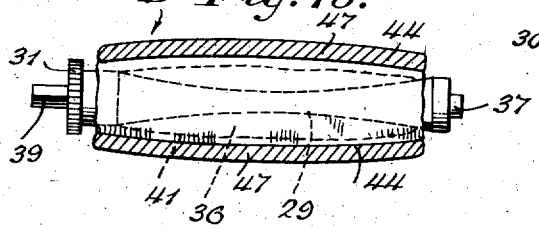

Figure 16 is a diagrammatic longitudinal sectional view of the coil of hair upon the curling rod enclosed in the heater.

Figure 17:
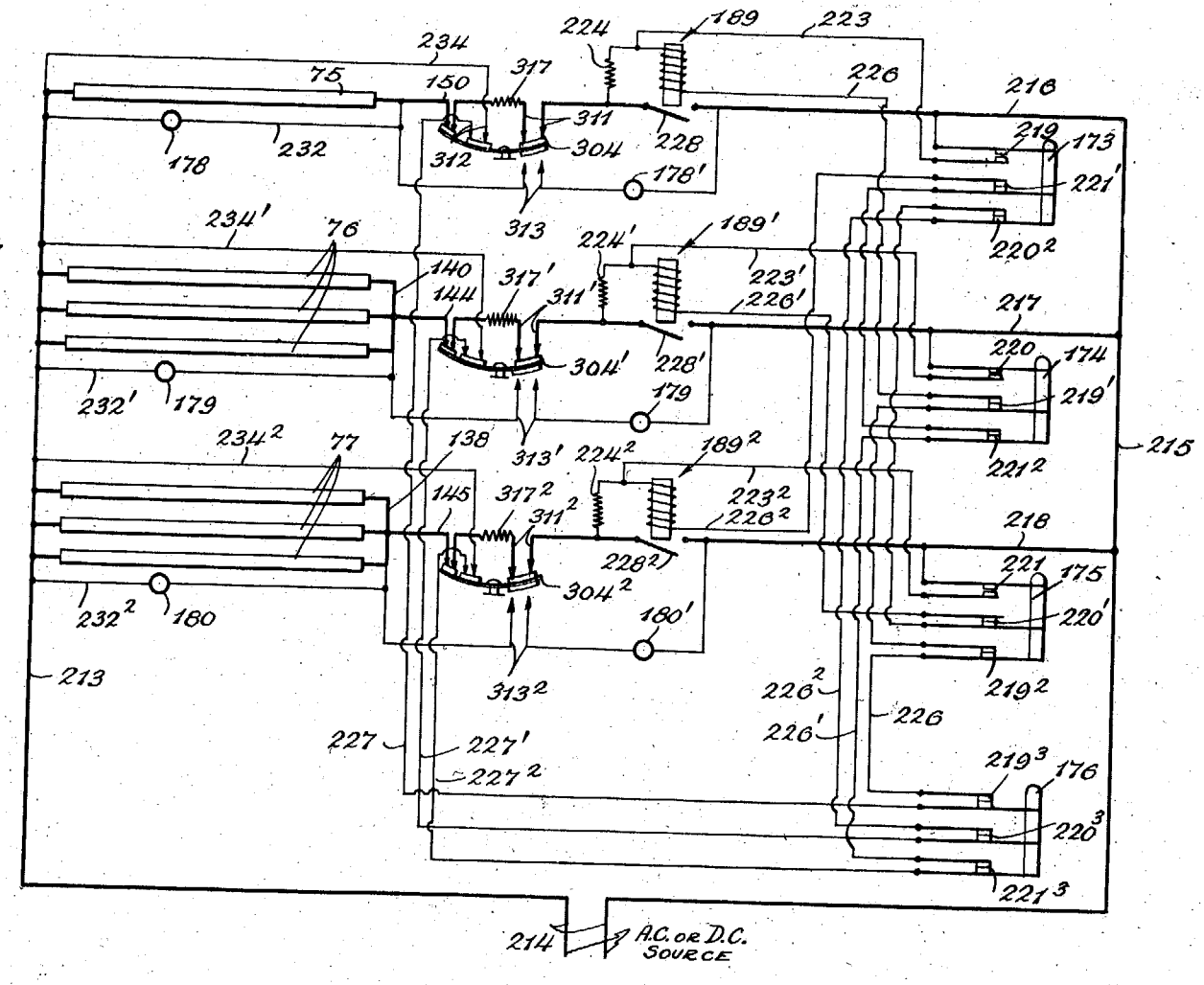

Figure 17 is a diagrammatic plan view similar to Figs. 9 and 10 of another electrical wiring diagram for the device of Figures 1 to 5 but utilizing a different thermostat construction.

Figure 18:
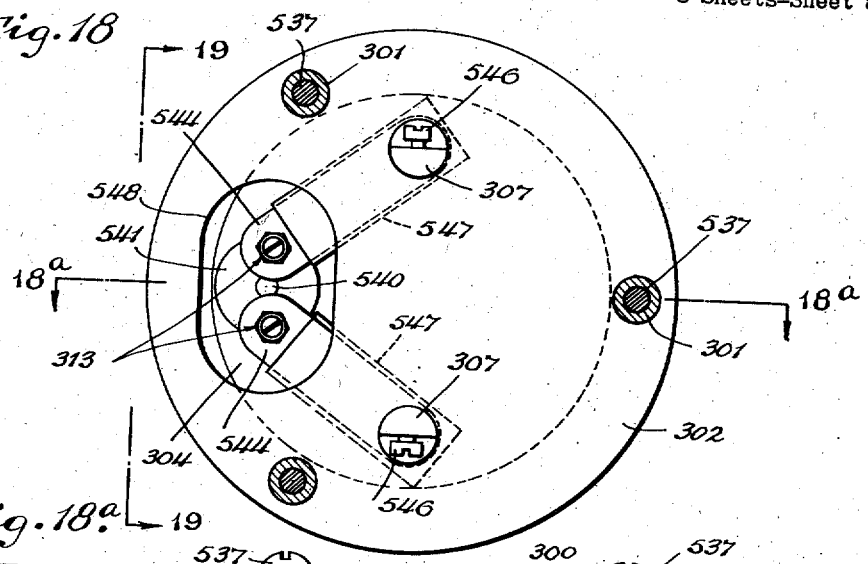
Figure 18A:
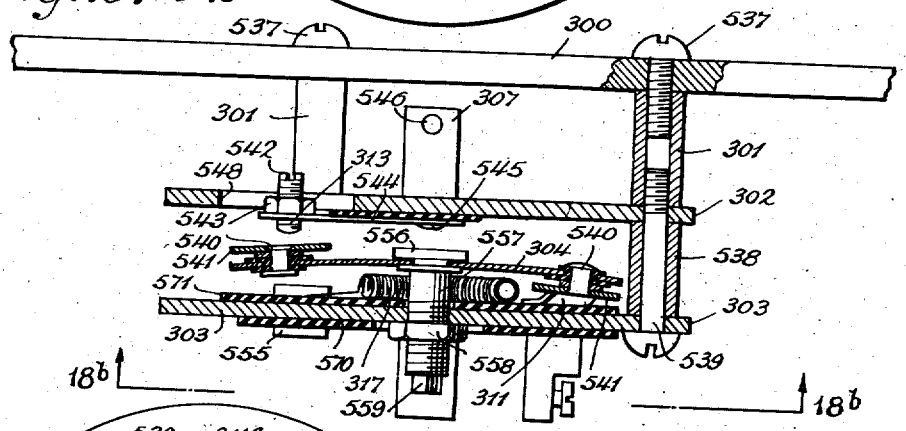
Figure 18B:
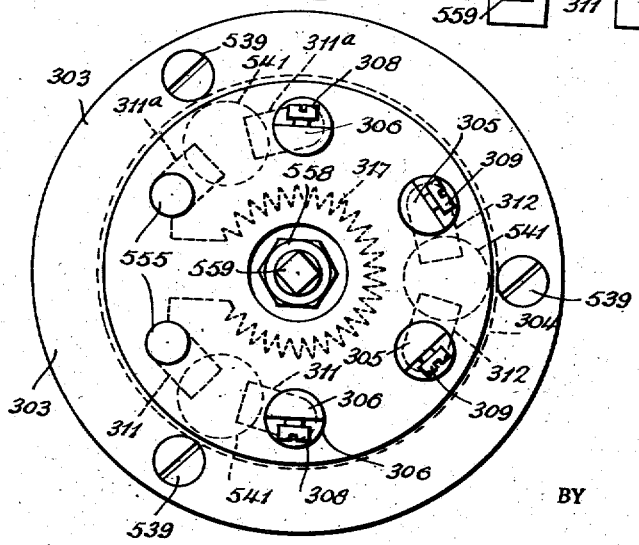

Figures 18, 18a, 18b and 19 illustrate the thermostat construction utilized in the circuit of Figure 17; Figure 18 being a transverse sectional view on the line 18—18 of Figure 19; Figure 18a being a cross sectional view upon the line 18a—18a of Figure 18; Figure 18b being a bottom elevational view on the line 18b—18b of Figure 18a and Figure 19 being a side elevational view on the line 19—19 of Figure 18.

Figure 20:
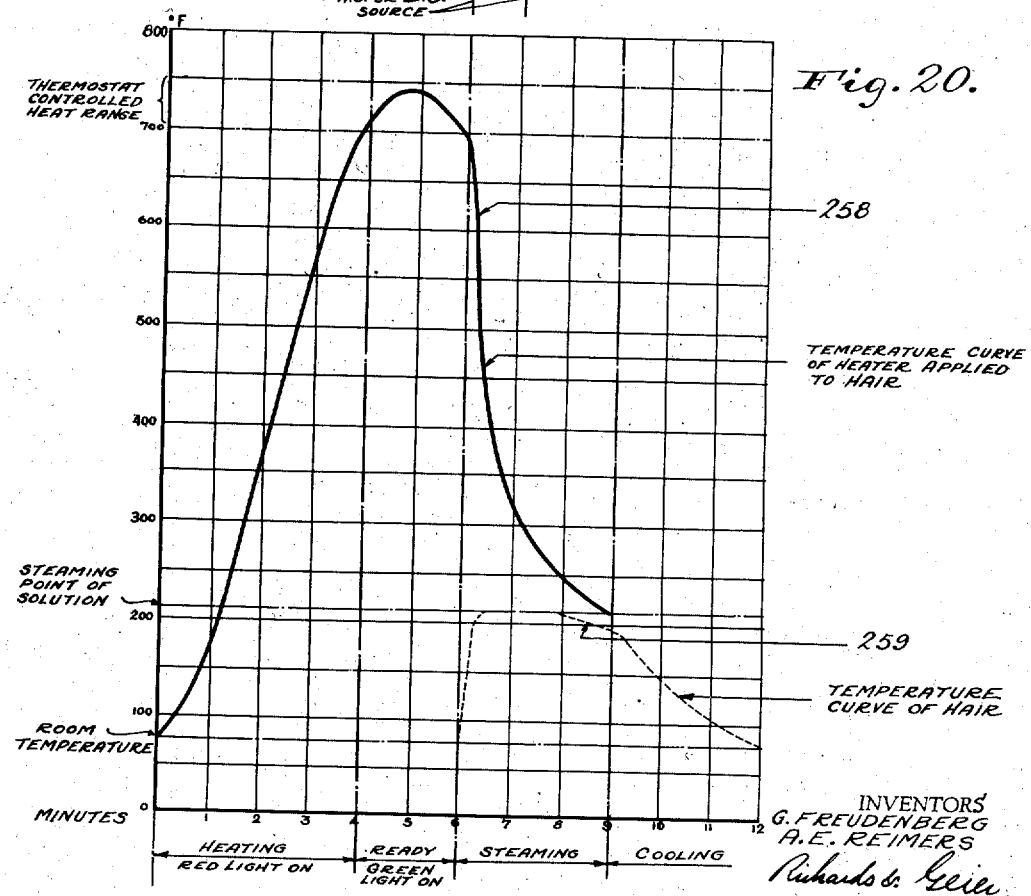

Figure 20 is a chart including curves illustrating the operation of the machine of Figures 1 to 5 in heating the heaters of Figures 11, 12 and 13 and also illustrating the steaming of the coil of hair after the heater has been placed in position as shown in Figures 15 and 16.

First, briefly to describe the process of permanently waving hair, the head of the woman is divided into areas and the strands 36 of hair from each of these areas are collected and clamped closely adjacent to the scalp by the clamping device A of Figure 13 which is provided with a base 25 on which is pivotally mounted at 27, the rubber enclosed clamping arm 26. One end of the bar 25 carries a pivotal mount 28 for the curling rod 29 and also the pawl 30 to cooperate with the ratchet 31 on the curling rod 29.

The other pivot mount 32 for the curler rod 29 is carried by the end of the arm 26 and is associated with the latch 33 which enables the arm 26 to be clamped against the side of the base 25 as best indicated at Figure 13.

These clamping devices A are more fully shown and described and also claimed in Patent No. 2,078,460, issued on application of Otto Seiter, Serial No. 52,520, filed December 2, 1935.

The end of the strand 36 is then placed upon the curling rod 29, as shown in Figure 13, and the finger 35 is closed down upon it, such finger 35 being pivotally mounted upon the curling rod 29 at 34.

The strand of hair 36 is then wound up on the curling rod 29 until the curling rod reaches the pivotal mounts 28 and 32, whereupon the pivot bearing 37 of the curling rod 29 may be placed on the pivot mount 32 and the somewhat larger pivot bearing 38 of the curling rod 29 may be placed in the pivot bearing 28.

The pawl 30 is resilient and will snap onto the ratchet 31.

The squared extension 39 at the end of the curling rod 29 enables the curling rod 29 to be tightened by a suitable key (not shown) whereby the hair may be tightened.

It will be noted that the pivot mounts 28 and 32 are positioned directly over the front edge of the bar 25 with the result that there will be a minimum stretch of hair between the clamping rod 26 and the curling rod 29.

After the strands of hair, about thirty, have been clamped, wound upon the curling rods 29 and then tightened by the operation just described they may be enclosed in hair waving pads, one of which is shown in Figure 14.

These hair waving pads consist of a sheet of flannel or felt 49 to which may be applied a suitable treating solution, one form of pad being about 2½" square, and being adapted to receive between 1 to 4 cc. of a suitable treating fluid about 2 cc. being preferred.

The back of the pad is formed by the sheet of impermeable fabric or parchment paper 41, the side edges of which are bent over, as indicated at 42 and glued or pasted down to the face of the fabric 40. Between the paper back 41 and the fabric face 40 is the foil 43, which may be desirably aluminum foil and which is preferably of such a thickness, say between 0.001 to 0.003 and preferably about 0.002 inch, that it will retain the pad in position about the coil of hair upon the curling rod 29.

Then, after all of the clamped and coiled strands 36 of hair have been enclosed in the moistened pads, as shown in Figure 14, the heaters B, as shown in Figures 11 and 12, are heated upon the heater rods of the machine of Figures 1 to 5 and placed upon the hair, as indicated in Figures 15 and 16.

The heaters B, as shown in Figures 11 and 12, are each provided with two alloy-metal heat-storing jaws 44, the alloy metal for example being metal known as Dow metal or some other alloy, for example containing magnesium and small amounts of aluminum and manganese.

Among the preferred alloys which may be utilized are those containing about 93 to 96% magnesium, 4 to 6% of aluminum and ¼ to ½ of 1% of manganese.

In one construction which has been found satisfactory the cylindrical metal jaws or heat storing members 44 are made about 2½ inches in length, about ⅛ to 3/16 inch in thickness and about ¾ inch in width having a weight of about 16 grams or between about 14 to 18 grams.

The specific gravity of the metal used is preferably about 1.76 to 1.82.

The edges of these jaws 44 are rounded as indicated at 45 as shown in Figure 12 at 46 and they are intermedially bulged as indicated at 47 in Figure 16 to accommodate the shape of the coil of hair which is usually of maximum protuberance at the middle portion of the curling rod 29 (see Figure 16).

To the outside faces of the bars 44 are riveted the spacer disks 48 and to these spacer disks are connected by the same rivets 49 the ends 50 of the U-shaped arm members 51.

These arms 51 are preferably of sheet metal and at their upper extensions 52 are screwed or riveted as indicated at 53 to the lower ends 54 of the Bakelite or heat insulating finger pieces 55.

The sides of the members 51 are provided with inturned ears 56 which receive the pivot rod 57. The pivot rod 57 receives the spring 58, the legs 59 and 60 of which press the two finger grip elements 55 apart and the jaws 44 together.

The finger pieces 55 are provided with the slots 60 and 61, the outside area of the finger piece around the slot 61 being preferably grooved or corrugated to enable a convenient finger grip thereon.

The lower slots 60 and the spacer disks 48, as shown in Figures 11 and 12 limit or decrease the amount of heat which may be transmitted from the heater jaws 44 to the portion of the finger pieces 55 around the slot 61 which is handled by the operator.

It will be noticed that the jaws of the heater 44 of Figures 11 and 12 are curved not only so as conveniently to grip the coil of hair indicated at 36 in Figure 16, but also the heating rod 75 as shown in Figures 11 and 12, the operation of which rod 75 is now to be more fully described in connection with the construction of Figures 1 to 5 and the wiring diagram of Figure 9 and the thermostatic controls of Figures 7 and 8.

Referring to Figures 1 to 6, the pre-heater machine is provided with a test heating rod 75 and having sufficient place for two heaters as shown in Figures 11 and 12. A group of three heating rods 76 having room for 15 heaters and another group of three heating rods 77 having room for 15 more heaters are also shown in Figures 11 and 12, all carried on the panel structure M.

Figure 2:
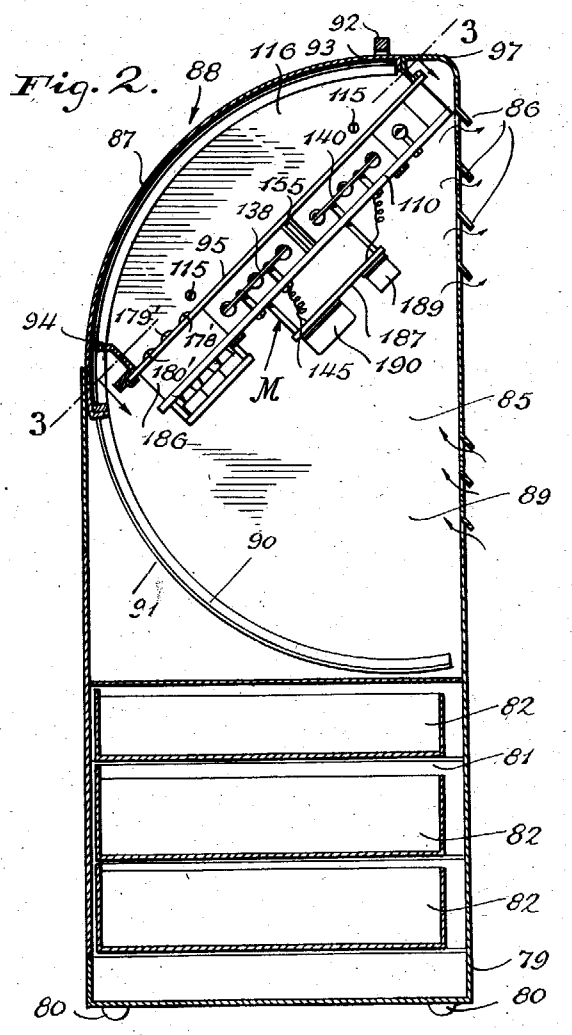
Figure 2 is a side sectional view on the line 2—2 of Figure 1 with the cover in position.
Figure 1:
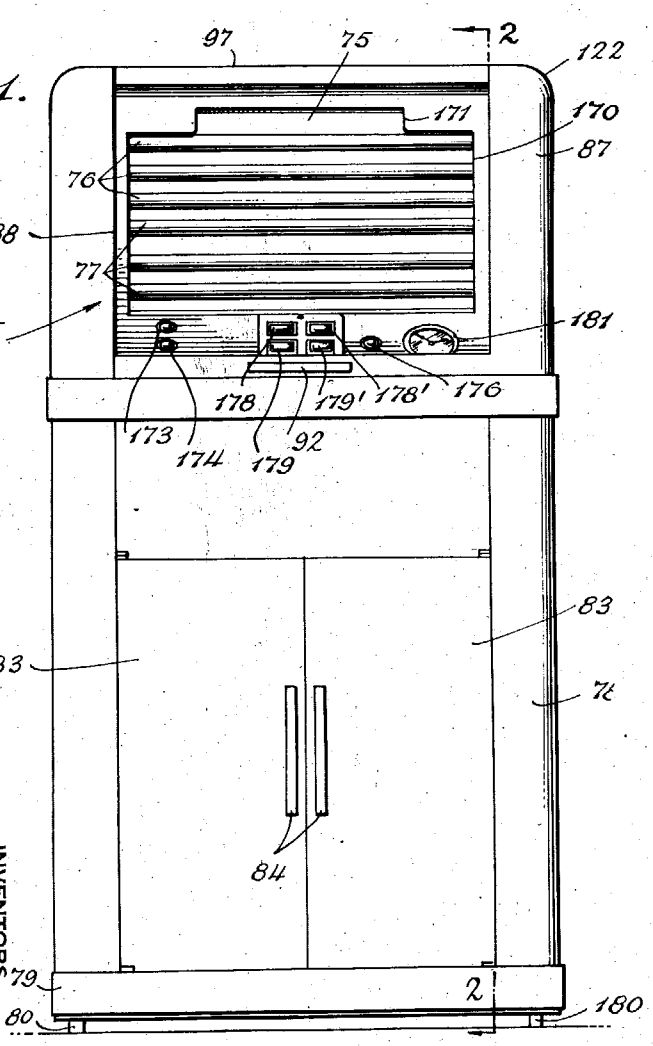
Figure 1 is a front elevational view of the heating machine with the cover opened.

The panel structure M, as shown in Figures 1 and 2 is provided with a sheet metal stand or support 78, the base 79 of which is provided with rollers or other floor contact members 80. The lower portion of the casing 78 forms a compartment 81 receiving the drawers 82 carrying the various supplies such as treating solution, hair waving pads, and so forth, as shown in Figure 14, clamps as shown in Figures 13 and 15, curling rods as shown in Figure 13 and heaters as shown in Figures 11 and 12.

Access is had to the compartment 81 and the drawers 82 by the doors 83 on the front of the cabinet which are provided with handles 84 (see Figure 1). The upper part of the cabinet 78 is provided with an enclosure 85, the rear portion of which is provided with the ventilators 86 and the front portion of which takes barrel form, as indicated at 87. The barrel 87 is intermediately cut away at 88 (see Figure 1) to form an opening through which panel structure M carrying the heating rods 75 to 78 is accessible. The sides of the opening are walled in by the side plates 116.

Figures 3, 4:
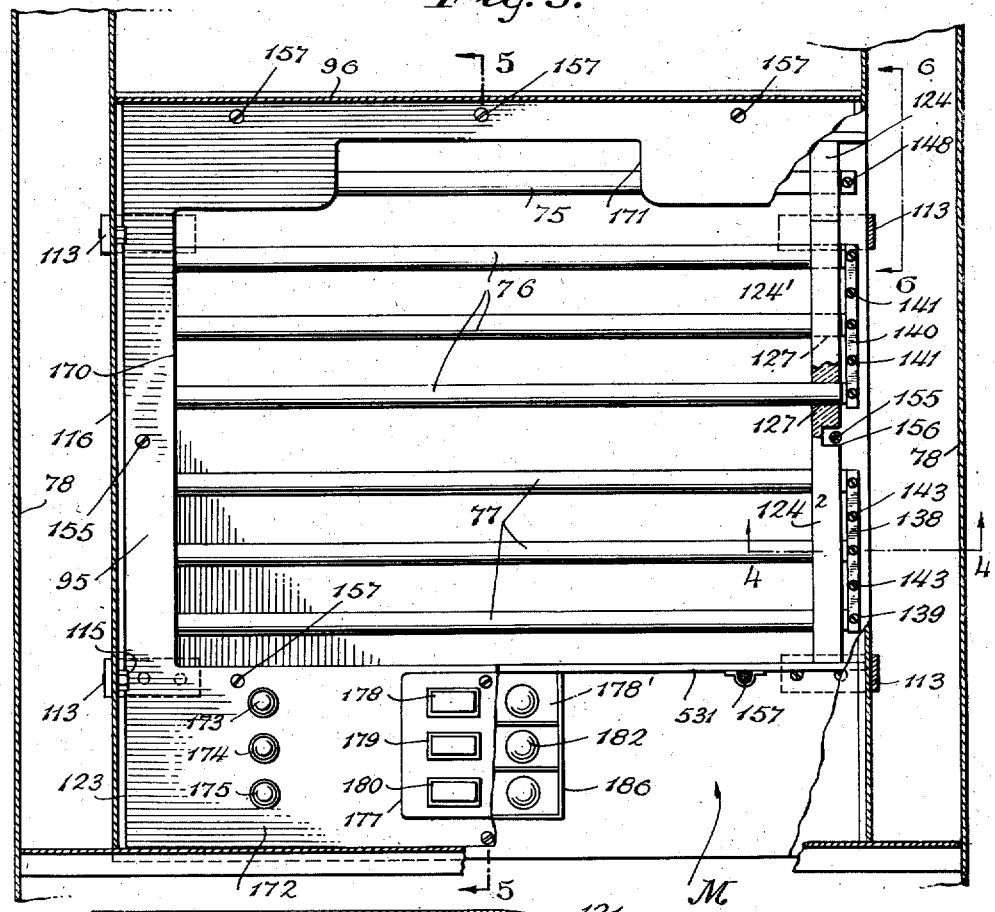
Figure 3 is a showing of the heater rods of Figure 1 upon the line 3—3 of Figure 2 with the cover plates partly removed to show the internal construction upon an enlarged scale.
Figure 4 is a fragmentary sectional view on the line 4—4 of Figure 3 upon an enlarged scale showing the construction and mounting of the ends of the heater rods.
Figure 5:
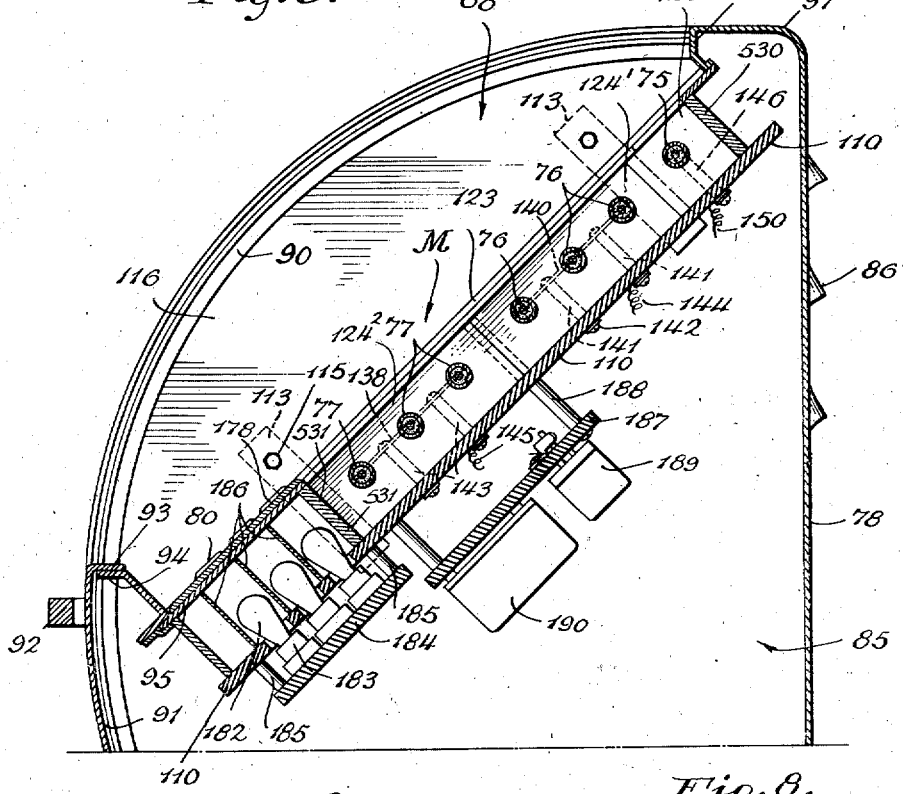
Figure 5 is a fragmentary side sectional view similar to Figure 2 but on enlarged scale, upon the line 5—5 of Figure 3 of the upper part of the heating machine.

The side plates 116 of the recess 88 are provided with angle runways 89 carrying a sliding barrel shaped cover 91 by the tongues 91*a* (see Figures 2, 4 and 5). The angle runways 89 are welded at their vertical sides 117 to said side plates 116 (see Figure 4). The slide plates 116 are connected by the angles 120 to the casing top 91, the flange 121 of the angle member 120 conforming to and being bolted, welded or riveted to the curved portion 122 of the casing 178 (see Figure 4).

The cover 91 is provided with a handle 92 (see Figures 1 and 5). When the sliding door 91 is opened or pressed downwardly into the enclosure 85 it is stopped by contact of its end flange 93 against the flange 94 projecting outwardly from the face plate 95 of the panel structure M.

When the sliding cover 91 has been moved upwardly to close the recess 88 of Figure 1, the inturned flange 93 will be stopped against the down turned flange portion 96 (see Figure 5) from the top 97 of the casing 78 and will be locked in position by the spring locks 98 which are positioned in the runway 90.

The panel structure M includes the base member 110, of say laminated Bakelite or some other relatively strong insulating material.

The Bakelite plate 110 is connected by the stud bolts and nuts 111 to the lower flange 112 of the bracket 113 which at the upper end of its side flange 114 is bolted at 115 to the dependent side-wall members 116.

The hanger member 116 also provided with an inturned portion 123 as shown in Figure 4 which contacts with the periphery of the face of the plate 95.

The sides of the panel 110 (see Figure 4) receive the insulating bars 124, 124′, 124² which are provided with studs 125 filling in recesses or bores 126 in said panel to fix the position thereof.

The bars 124, 124′, and 124² are provided with recesses 127 which receive the end of the shells 128 of the heater rods 75, 76 and 77.

Referring to Figure 4, each of the heater bars 75, 76 and 77 are provided with a central rod 129 of porcelain or some other heat resistant or insulating material around which is wound the coil 130 of resistance wire, the rod 129 and the bar 130 being separated from the shell and spaced within the metal shell 128 by an insulating powder 131, such as for example the powder composed of in whole or in part of calcined magnesium oxide.

Into the ends of the shells 128 (see Figure 4) are inserted the connector elements 134 which are insulated from the shell 137 by the sleeve 132 and the washers 133.

From the more closely wound portion 135 of the coil 130, a connecting wire extends through a door through the connector elements 134 and this connecting wire is clamped upon a shelf 147 at the end of the element 134 by the screw 139.

The plug 134 is provided with the cylindrical portion 136. The shoulder or shelf 137 for receiving the bus bar or contact strip 138 which is screwed thereto by the screws or bolts 139 which extend down to the panel 110 and are held thereon by the nuts 139*a*.

Figure 6:
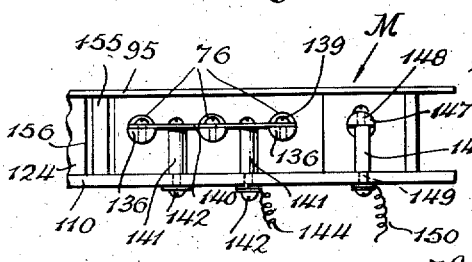
Figure 6 is a fragmentary side elevational view on the line 6—6 of Figure 3 of the connections on the ends of the heater rods and mounts thereof.

As shown in Figures 5 and 6, the heater rods 76 are similarly provided with shelved cylindrical members 139 carrying the bus bar 140 and this bar 140 is connected by posts 141 and the screws 142 (see Figure 6) onto the panel 110.

The bus bar 138 in connection with the rods 77 (see Figure 5) is connected by similar posts 143 to the base plate 110 and circuit connections 144 and 145 are respectively made to one each of said posts 141 and 143, which in turn supply the bus bars 140 and 138.

The supporting construction just described is the same at both sides of the panel structure M so that current may be caused to flow between the opposite bus bars 138 and 140 through the coils 130 as shown in Figure 4 to heat the metallic shells 128 of the heater rods 76 and 77.

Referring to Figure 4 because of the insulating bar 124, the terminal 134 and the insulators 132 and 133, the heat generated at the end of the shell 128, adjacent where it is inserted into the recess 127 of the block 124 will be much less than at the middle portions of the shells 128 of the heater rods 76 and 77 so that it is desirable to wind the coil 130 more closely at 135 adjacent the ends thereof and adjacent the support blocks or bars 124, whereby a more uniform heat distribution will be maintained over the entire length of the bar assuring that the two end heaters B placed upon each of the rods 76 and 77 will be equally heated with the intermediate groups of three heaters placed upon each of these rods.

The cylindrical end portion 147 of the test heater rod 75 (see Figure 6) is connected directly to the posts 146, with its lower portion cut off to about the top of the post 146. The screw 148 screws into said post through the end portion 147. The lower end of the post, as indicated at 149 passes through the base board 110 and is provided with the electrical connection 150.

The face plate 95, as shown best in Figure 3 is supported on the posts 155 fitting in the recesses 156 in the bars 124 (see Figures 3 and 6) and also on the posts 157. The front and back of the recess between the blocks 124, 124′ and 124² is enclosed by the front and rear walls 530 and 531 (see Figure 1). The plate 95 has a central squared opening 170, the width of which is sufficient to permit the rods 76 and 77 to receive five heaters B each of the type as shown in Figures 11 and 12 and is provided with a smaller recess 171 at the top thereof to expose a portion of the rod 75 which will be sufficient to permit said rod to receive two heaters B.

The lower part of the face plate 172 provides a control and signal board which has a button 173 operating the test rod 75, another button 174 for operating the group of rods 76 and a third button 175 for operating the group of rods 77.

These three buttons 173, 174 and 175 can only be operated one at a time by an arrangement which will be subsequently described in connection with the wiring diagram of Figure 9 so that the heat will be applied only to the rod 75 or to the group of rods 76 or the group of rods 77.

The throw out button 176 (see Figure 1) enables the rods 75 or 76 or 77, according to which is operating to be thrown out of operation.

The central panel 177 covers a central opening in the lower portion 172 of the plate 95 behind which is positioned a series of electric lights, say six in number, which electric lights respectively illuminate the red windows 178, 179 and 180, said windows being respectively illuminated when the rods 75 or the rods 76 or the rods 77 are being heated by the coils 130.

Positioned alongside of the red windows 178, 179 and 180 are the corresponding green windows 178′, 179′ and 180′ (see Figure 1) which become illuminated when the red lights go out.

The wiring circuit of Figure 9 which is to be described, is so arranged that the lights 178 to 180 will automatically be turned off when the rods 75 to 77 have reached the desired temperature and the green lights will then remain illuminated after the current is cut off from the rods 75, 76 and 77, until the rods will have cooled to such a low temperature that the heaters B thereon cannot be satisfactorily applied to a hair coil as illustrated in Figures 16 and 17. The green lights indicate to the operator the period when the heaters may be applied to the hair coils.

The clock 181 which is positioned alongside of the central panel 177 enables a ready indication of when the heaters B should be removed from the hair, as indicated at Figures 15 and 16.

The time intervals will more fully appear in connection with the curves of Figure 20.

As shown best in Figure 5, the six electric lights 182 which illuminate the red windows 178 to 180 and the green windows 178′ to 180′ of Figure 3 are received in the sockets 183 which sockets in turn are supported upon the base 184.

This base is supported by the brackets 185 from the main plate 110 and the lamps 182 are separated by the partitioning walls 186 so that they will individually illuminate one of the red or green windows 178 to 180 and 178′ to 180′.

The thermostat 190 and relay devices 189 which are utilized in the circuit are also carried upon a board 187 which is supported by the bracket 188 from the main base 110.

The thermostat elements may be of various types and for example, as shown in Figures 7 and 8 or Figures 18 and 19 and their structures and operation will be more fully described. The relays 189 may be of conventional structure.

Referring to Figure 9, the rods 75, 76 and 77 are respectively provided with circuit connections 150, 144 and 145, the circuit connections 144 and 150 leading to the bus bars 140 and 138 respectively.

The other side of the bars 75, 76 and 77 are respectively connected by the leads 210, 211 and 212 to the main conductor 213 which returns to one side of the electrical source 214.

The other side of the electrical source 214 supplies the conductors 215 which in turn supplies the three conductors 216, 217 and 218.

Referring to the operation of one of the buttons 173 in Figure 9 (see also the control board in Figure 3) the two contacts 220² and 221′ are normally closed while the contact 219 is open.

Buttons 174 and 175 are also respectively provided with normally opened contacts 220 and 221, while the throw off button is provided with three closed contacts 219³, 220³ and 221³.

When the button 173 is depressed to operate the test rod 75 the contacts 220² and 221′ which are on the circuit of the rods 76 and 77 will be opened and the contact 219 will be closed.

The opening of the contacts 220² and 221′ will prevent heating of the rods 76 and 77 when the rod 75 is being heated.

The closure of the contact 219 on the other hand, will establish a circuit through the conductors 222 and 223 through the coil 225 and conductor 226 to contacts 219′ of button 174.

Then from the contact 219′ the current will flow to and through the contact 219² which will be closed when the button 175 has not been depressed. From the contact 219² the current will flow to the contact 219³, which will remain closed when the throw off button 176 has not been operated.

From the contact 219³ the current will flow through the conductor 227 to the thermostat 190 and from the thermostat 190 to the lead 234 and back to the source of energy 214 through the conductor 213.

The flow of current just traced, however, exists only long enough to pick up the armature 228 of the relay 189, thus closing the main circuit from the conductor 216 through the switch 228, the conductor 150, the heater rods 75 and the lead 213 back to the source 214.

The circuit 216—150 thus closed, however, will assure continued energization of the solenoid coil 225 by the by-pass resistance 224 and the conductor 226 past the closed contacts 219', 219² and 219³. Therefore, the relay switch 228 will remain closed until the circuit through the coil 225 is opened at one of the contact pairs 219', 219² or 219³, or by the opening of the contacts 249 of the thermostat 190.

The ends of the leaf structures 240 and 242 of the thermostat 190 (see Figure 8) are provided respectively with down turned and upturned end fingers 251 and 252 which contact with the end of the adjusting screws 253 and 255. These screws are supported in the brackets 254 and 256.

The center leaf structure 241 is made of thermostatic bimetallic construction and is much stronger in its resilient action so that when it is in extreme positions it will force the fingers 251 and 252 off their adjusting screws 253 and 255 as indicated by the space 263 in Figure 7a.

As indicated in Figure 8, and also in Figure 9, when the coil 233 starts to heat concurrently with the rod 75 the structures 240 and 241 will move together with the contacts 249 closed to maintain a circuit to energize the solenoid 225 and close the relay 189. In four to five minutes the leaf structure 241 will have moved sufficiently so that the finger 251 will come in contact with the end of the adjusting screw 253 stopping movement of the leaf structure 240.

However, the bi-metallic structure 241 will continue to move toward the leaf structure 242 which is stopped against the end of the screw 255, to close the contact 250.

The adjustment of the screw 253 and 255 should be such that as soon as the contacts 249 have separated then the contacts 250 will be closed and referring to Figure 9, this operation will extinguish the red signal 178 and connect the conductor 257 to the conductors 234 and 213 illuminating the green signal 178'.

The opening of the contacts 249 should take place when the rod 278 has been heated to the proper temperature say between 700 and 800 degrees F. The opening of the contacts 249 will deenergize the solenoid 225 of the relay 189 permitting the switch 228 to open and cutting off the heating coil 130 within the rod 75, and the heating resistance element 233 of the thermostat device.

The extinguishing of the red signal 178 and lighting of the green signal 178' is an indication to the operators of the machine (see Figures 1 to 5) that the heaters on the rods 75 have been elevated to the proper temperature for application to the pad enclosing the coil of hair as in Figures 15 and 16.

Since no further current has been supplied to the rod 75 and to the resistance element 233 of the thermostat 190, the temperature will begin to fall and as soon as this occurs the bi-metallic structure 241 will move back to original position as shown in Figure 8, with the contacts 250 closed until the finger 252 strikes the end of the adjusting screw 255.

Since the bi-metallic structure 241 will continue to move toward the position of Figure 8 the contacts 250 will be separated opening the circuit across the green signal 178' which will give an indication to the operator of the machine of Figures 1 to 5 that the heating clamps of Figures 11 and 12 are now at too low a temperature to be used in permanent hair waving operation.

In the meanwhile, when the operator has removed the heaters from the rods 75, he will be able to set the clock 181 to a desired number of minutes of streaming time and when the clock rings a bell, as shown, which may be provided therein or lights a light which may also be provided if desired, the heaters of Figures 11 and 12 are removed from the hair coils, as shown in Figures 15, 16 and replaced in the same order on the rods 75.

As indicated in Figure 20, the solid curve 258 diagrammatically represents the change in temperature of the semi-cylindrical elements 44 of the heaters of Figures 11 and 12 while the dotted curve 259 represents the temperature of the hair coil.

As soon as and as long as the solenoid 225 has been energized the switch 228 forming part of the relay 189 will be closed completing the circuit of the heater rod 75 across the contacts 229 and 230.

The current will also flow in parallel with the heater rod 75 across the conductor 232 which will illuminate the red signal 178 and through the resistance 233 and the conductor 234 to the other side of the circuit 214 said resistance 233 forming part of the thermostat construction 190.

The construction 190 of Figure 9 is shown in detail in Figures 7 and 8 and it consists of an insulated base 235 which is screwed at 236 to the base 187 (see Figure 7).

The base carries the Z-brackets 237 and 238 which are screwed at 239 and 244 to said base 235 and at their upper ends are provided with connections 258 to the resistance heater 233 which is circuited across the conduits 150 and 234, as shown in Figure 9.

Directly under the resistance heater 233 are the spring leaf constructions 240, 241 and 242 which are normally in the position as shown in Figures 7a and 8 when cold. The spring construction 241 may include bi-metallic elements, as may also the constructions 240 and 242.

The leaf structures 240, 241 and 242 are mounted at 259 and clamped together with insulating separators 260 by the bolts 261.

The leaf structures 240, 241 and 242 are respectively connected to the binding posts 243, 244 and 245 as shown in Figure 8. The leaf structures 240 and 241 are adapted to be electrically connected by the contacts 249 while the leaf structures 240 and 242 are adapted to be connected by the contacts 250. The center leaf structure 241 is also preferably provided with radiating fins not shown or other radiating means to assure that it will cool down sufficiently rapidly to correspond to the rate of cooling of the heater rod 75 and the heaters thereon.

It will be noted that in Figure 20 the thermostat of Figures 7 and 8 is adjusted so that the current will be on for about four minutes presenting a red signal whereupon a thermostat will automatically turn off the current to the heating rod 75, and also turn off the red signal 178.

At the same time, the green light 178' will light for such a period until the heater rods 75 or the heat storing elements 44 thereon, as indicated in Figures 11 and 12 will have fallen in temperature so that they may no longer be satisfactorily utilized for waving hair.

As indicated in Figure 20, the heating is discontinued when the temperature of the heater 44 increases to 700 degrees F. or above and when the current is then turned off by the thermostat 190 the temperature will increase for a short while and then will rapidly drop, a sufficiently high temperature above 700 degrees F., however, being maintained for about two minutes as indicated by the green signal.

As soon as each of the heaters of Figures 11 and 12 have been removed from the rod 75 and placed upon the hair coil, their temperature will drop very rapidly as shown by the curve 258 in Figure 20 and at the same time, temperature of the hair coil will abruptly be raised to the steaming temperature, as shown by the dotted curve 259 which steaming temperature may be maintained for a period of time which may vary with the character of hair from between one to three minutes.

The test rod 75 holding two heater devices, as shown in Figures 11 and 12 enables a testing of a strand of hair which will determine the best heating period for the entire head of hair.

It will be noted in referring to Figure 20 that the temperature curve 258 of the heaters 11 and 12 is so controlled that the hair will be substantially raised to the steaming temperature of 212 degrees well within the first twenty seconds and maintained at such temperature for substantially a minute and a half. When the steaming has been completed, the heater B of Figures 11 and 12 is removed from the hair and replaced on the rod 75.

The pad of Figure 14 is then removed from the hair coil and the hair coil is permitted to cool while tightly coiled upon the curling rod 29 as indicated at Figures 15 and 16 before it is un-wound therefrom so that it will attain a permanent wave effect.

The process just described in connection with the test rod 75 may be repeated in connection with the groups 76 and 77, similarly functioning parts being indicated by the same numerals primed in the wiring diagram of Figure 9.

In connection with the heating rods 76, the button 174 when depressed will close the normally open contact 220 and open the contact 219′ and $221^2$. This will energize the solenoid 189′ and close the switch 220′ whereupon electric current will flow through the coils and the heater rods 76, the opening of the contacts 219′ and $221^2$ preventing closing of the switches 228 and $228^2$.

At the same time, the red signal 179 will light and when the rods 76 have been heated to the proper temperature the contact 249′ will open and the contact 250′ will close extinguishing the lamp 179 and illuminating the green signal 179′, which will remain lighted until the thermostat 190′ again causes opening of the contacts 250′.

During this interval when the green signals are on (for say approximately two minutes) the operator may successively remove the 15 heat storing members B from the rods 76 and place them upon the coils of hair enclosed in the pad as indicated in Figures 15 and 16.

It has been found that this operation of taking off the 15 heaters B from the rods 76 and applying them to the hair will take about one minute.

At the start of the operation, the clock 181 is operated to ring at the end of the desired steaming time determined by the test previously described (which steaming time, for example, may be about three minutes).

As soon as the clock 181 rings indicating the steaming time is up, the operator then removes the heaters B in the same order from the hair coils as said heaters B were placed thereon.

By removing the heaters from the rods 76 and then re-placing them on the rods 76 in the same order, assurance is had that each coil of hair will have about the same length of treatment, say three minutes.

Usually, a normal head of hair will have about 30 coils of hair to be treated necessitating the utilization of 30 heaters B.

In such a case, as soon as the heaters have been removed from the rods 76 and then replaced thereon, after the hair has been steamed, the pads are removed from the hair which is permitted to cool to room temperature, as indicated in Figure 20, by the dotted curve.

The other 15 coils of hair are then processed in the same manner by heaters B raised to temperature on rods 77.

The heating of the rods 77 may be initiated by pressing the button 175 to close the contact 221 and open the contacts $219^2$ and 220′, the latter preventing simultaneous closure of the switches 228 and 228′.

Only one of the rods or group of rods 75, 76, 77 may be heated at one time in view of the fact the buttons 173, 174 and 175 in closing their own circuits simultaneously open the circuits of the other groups.

The red signals 187, 179 and 180 respectively indicate when the rods 75 to 77 are being heated and the green signals 178′ to 180′ indicate when the rods 75 to 77 have been raised to proper temperature so that the heaters B may be removed therefrom and applied to the hair coils.

The throw off button 176 controls contacts $219^3$, $220^3$ and $221^3$ which normally remain closed, but which, when open, will throw out the relay switches 228, 228′ or $228^2$.

It is, of course, apparent that each one of the heater rods might be provided with an individual control as test rod 75 or the rods 75 to 77 could be arranged in other groupings to carry a smaller or larger number of heaters than two for the rods 75 or 15 each for the groups of rods 76 and 77.

It has been found, however, in commercial practice that the grouping as set forth herein is most satisfactory and lends itself to the convenience of the operator of the hair waving machine.

Figure 19:
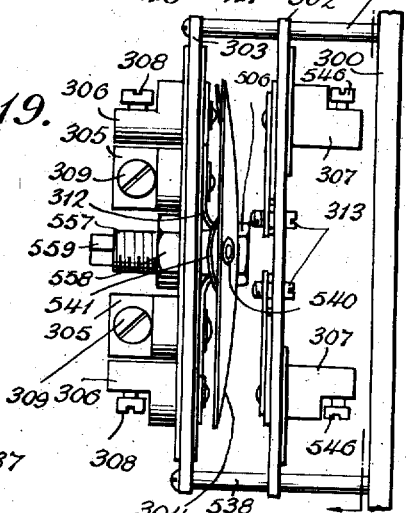

The wiring diagram of Figure 17 is substantially the same as that of Figure 9 except that the thermostatic arrangement of Figures 18 and 19 is utilized in lieu of the thermostatic arrangement of Figures 7 and 8.

Identical parts on Figure 17 as on Figure 9 are indicated by the same numerals as on Figure 9.

The thermostat of Figures 18 to 19 is normally supported from the base 300 by the mounting sleeves 301 which are attached to the base by screws 537. The thermostat construction per se is provided with the opposite contact carrying plates 302, 303 which are spaced apart by the sleeves 538, said sleeves receiving the bolts 539 which screw into the mounting sleeves 301.

Between the contact plates 302 and 303, is positioned the bi-metallic thermostatic plate 304. The thermostatic plate 304 at its adjacent periphery is provided with studs 540 which carry the contact plates 541.

The bi-metallic plate 304 carries one plate 541 at one side to cooperate with the contacts 313 and three plates 541 at the other side to cooperate with the contacts 311, 311′ and 312.

The contacts 313, best shown in Figures 18a and 18b are adjustable and they include the stud screws 542 which are locked in position by lock nuts 543 on the spring leaves 544. The spring leaves 544 are connected at 545 to the binding posts 307. The binding posts 307 are provided with the clamping screw 546. The insulating plates 547 are positioned between the leaves 544 and the base plate 302.

The recess 548 permits ready access to the studs 542 and lock nuts 543 to enable adjustment.

The binding posts 305 are connected to the contacts 312. The binding posts 306 are each respectively connected to one of the members of the pairs of contacts 311 and 311a. The other contacts of the pairs 311 and 311a are connected by the studs 555 (see Figures 18a and 18b) to the end leads of the resistance coil 317.

The studs 555, the coil 317, the posts 305 and 306 and the contacts 311, 311a and 312 are insulated from the plate 303 by the insulating discs 570 and 571.

By the arrangement, as shown when the bi-metallic plate 304 snaps away from the contacts 311, 311a, and 312 the resistance heating coil 317 will be entirely cut off from the circuit 216, 250 and the circuit through the main resistance heater 275 will be broken at two points at both sides of the auxiliary resistance heater 317.

The snap action of the bi-metallic plate is adjustable since the plate is supported at 556 by the threaded stud 557 which screws through the outer plate 303 of the thermostat.

By loosening the lock nut 558 and applying a wrench to the squared end 559 of the stud 557, an adjustment of the bi-metallic plate 304 may be had.

The heating coils, as diagrammatically indicated at 317, 317' and $317^2$ on Figure 17 are associated with the bi-metallic plate 304 so as to cause snapping of said plate from the position as shown in Figure 17, where it closes the contacts 311, 311a and 312 to the opposite position where it closes the contacts 313 and opens the contacts 311, 311a and 312.

As is apparent from an inspection of Figure 17, when the circuits are closed by one of the buttons 173 to 175, the current will flow across the respective contacts 311 and 311a to energize the respective rods 75 to 77 and to light the respective red signals 178 and 180 which are arranged in parallel with said rods 75 to 77.

It will be noted that the thermostatic heating resistances 317 to $317^2$ in case of Figure 17 are arranged in series with the heating rods instead of in parallel therewith as in Figure 9.

When the rods 75 to 77 in the diagram of Figure 17 have heated sufficiently, the resistance elements 317 to $317^2$ will have sufficiently raised the temperature of the bi-metallic plates 304 respectively to cause them to snap over into the opposite curvature from that indicated in Figure 17 and close the contacts 313 cutting off the supply of electric current to the heater rods 75 to 77.

The closure of the contacts 313 will cause the illumination of the green signals 178', 179' or 180' respectively.

As soon as the thermostats have cooled down, the thermostat plates 304 to $304^2$ of Figure 17 will snap over to their initial positions, as indicated in Figure 17, to await another operation by the push buttons 173 to 175.

It is, of course, obvious the circuit connections, as shown in Figures 9 and 17 may be varied so as to cut in a resistance into the circuit of the rods 75 to 77 and thus maintain them at the elevated temperature for a longer period of time and it is also possible to arrange the circuits so that the rods 76 and 77 will be successively or simultaneously heated to the desired temperature.

In the alternative wiring diagram of Figure 10, the rods 75, 76 and 77 are controlled by means of thermostatic bi-metallic plates 325, 325', $325^2$, $325^3$ which are respectively provided with the auxiliary heating coils 326, 326', $326^2$, $326^3$. One of the higher resistance heating coils $326^3$ of the plate $325^3$ is connected in parallel or in shunt with each of the heating coils 326, 326', $326^3$. When heated to the predetermined temperature the plates 325 will snap over into the dotted line positions opening the circuit.

A single relay construction 327 with the solenoid 328 and the switch 329 is employed, the particular rod or group of rods to be heated being determined by the manually actuated selector switch 330. This selector switch 330 is adapted to establish connection with the contacts 331, 331', $331^2$ respectively connected to the rods 75, 76 and 77.

There are two push buttons provided, the starting button 600 and the throw out button 601. When the button 600 is closed it will cause energization of the solenoid 328 through the circuit 602, 603, the resistances 604, 605, the conductor 606, the thermostat $325^3$ and the conductor 607 back to the source. Energization of the solenoid 328 after closure of the switch 329 through the conductors 602, 608, the switch 329 and then through the same course as previously described.

The throw-out button 601 will act as a shunt across the solenoid 328 to enable de-energization thereof at any time.

When the switch is in the position of Figure 10, the rod 75 will be heated and the red signal 178 in parallel with the rod 75 is illuminated until the resistance coil 326 heats up the thermostat plate 325 sufficiently to cause it to snap over.

This will open the circuit through the rod 75 and the red signal 178. The opening of the circuit at the plate 325 will cause an increased current to flow through the conductor 610 lighting the green signal and through the conductor 611 and the respective coil $326^3$.

As a result the plate $325^3$ will be heated and in a short time the plate will snap over into dotted line position de-energizing the relay solenoid 328 and opening the switch 329. This will happen before the plates 325, 325' or $325^2$ have cooled sufficiently to snap back into solid line position. This opening of the switch 329 may also be accomplished at any time desired by closing the button connection 601. The green signal 179 will then be extinguished.

To start the pre-heating again it is necessary to close the switch 600, when the plates 325 to $325^3$ have cooled and snapped back to their solid line positions, and after the rod or rods 75 to 77 to be heated have been selected by the switch 330.

Instead of heaters of the type of Figures 11 and 12, heaters with resistance coils in their jaws may be employed and positioned in connector sockets or between spring contact clips which cause a heating current to elevate such jaws to a desired temperature. This of course would eliminate the rods 75 to 77 but the circuits of Figures 9, 10 and 17 and the stand of Figures 1 to 5 could be readily employed.

The connector sockets or spring contact clips, which might close the circuit across contact pins or bosses at the ends of the jaws 44 of the heaters might be conveniently arranged in rows in lieu of the rods 75 to 77.

It is apparent that many other variations and modifications might be made in the device as specifically described by way of illustration above and it is to be understood that the illustrative embodiments described therein have been set forth herein not by way of limitation, since it is intended to cover all such modifications and variations within the scope of the present invention.

In the thermostat of Figures 18 to 19, the heater coil 317 may also be placed outside of either plate 302 or 303 to give a more controlled heating effect, and if desired, the space between the plates 302 and 303 may be provided with an annular closure to decrease the cooling rate of the disk 304.

What is claimed is:

1. A process of permanently waving women's hair which comprises selecting a strand of hair, clamping the strand closely adjacent the scalp, winding the strand upon a curling rod until wound up to the place of clamping, enclosing the wound up strand in a moistened pad, preheating two metal surfaces to a desired elevated temperature to cause several minutes steaming of the pad without additional heating, indicating when the surfaces have been heated and are being maintained at said desired temperature, and then clamping the pad between the previously heated metal surfaces.

2. A process of permanently waving women's hair which comprises dividing the head into areas of desired size, position and shape, selecting strands from said areas, clamping the strands of hair closely adjacent the scalp, winding up the strands into tight coils up to the place of clamping, enclosing said coils in form retaining absorbent pads backed by metal foil, then heating a series of cylindrical metal elements indicating the duration of the heating period and also when the metal elements have been sufficiently heated, thereupon automatically cutting off the current, removing said metal elements successively from the heater device and clamping them onto the enclosed coils, indicating when the metal elements should be removed from the hair coils and successively removing them from said coils and replacing them in the same order in the heater device and then removing the pads to permit the hair coils to cool.

3. A process of permanently waving women's hair which comprises dividing the head into areas of desired size, position and shape, selecting strands from said areas, clamping the strands of hair closely adjacent the scalp, winding up the strands into tight coils up to the place of clamping, enclosing said coils in form retaining absorbent pads backed by metal foil, then heating a series of cylindrical metal elements by a heater device, indicating the heating period and also indicating when the metal elements have been sufficiently heated, thereupon automatically cutting off the current, removing said metal elements successively from the heater device and clamping them onto the enclosed coils, indicating when the metal elements should be removed from the hair coils and successively removing them from said coils and replacing them in the same order in the heater device and then removing the pads to permit the hair coils to cool, said heater device heating said metal elements in groups and said elements being placed upon the enclosed hair coils successively and removed in the same order in said groups.

4. A process of permanently waving women's hair which comprises dividing the head into areas of desired size, position and shape, selecting strands from said areas, clamping the strands of hair closely adjacent the scalp, winding up the strands into tight coils up to the place of clamping, enclosing said coils in form retaining absorbent pads backed by metal foil, then heating a series of cylindrical metal elements, indicating the heating period and also indicating when the metal elements have been sufficiently heated, thereupon automatically cutting off the current, removing said metal elements successively from the heater device and clamping them onto the enclosed coils, indicating when the metal elements should be removed from the hair coils and successively removing them from said coils and replacing them in the same order in the heater device and then removing the pads to permit the hair coils to cool, said indicating being achieved by actuating visual signals.

5. A process of permanently waving women's hair which comprises dividing the head into areas of desired size, position and shape, selecting strands from said areas, clamping the strands of hair closely adjacent the scalp, winding up the strands into tight coils up to the place of clamping, enclosing said coils in form retaining absorbent pads backed by metal foil, then heating a series of cylindrical metal elements, indicating the heating period and also indicating when the metal elements have been sufficiently heated, thereupon automatically cutting off the current, removing said metal elements successively from the heater device and clamping them onto the enclosed coils, testing the character of the hair to determine the length of time said elements should be applied and when they should be removed, indicating when the metal elements should be removed from the hair coils and successively removing them from said coils and replacing them in the same order in the heater device and then removing the pads to permit the hair coils to cool.

6. A process of permanently waving women's hair which comprises dividing the head into areas of desired size, position and shape, selecting a number of test strands from certain of said areas, clamping the strands of hair closely adjacent the scalp, winding up the strands into tight coils up to the place of clamping, enclosing said coils in form retaining absorbent pads backed by metal foil, then heating the same number of cylindrical metal elements, indicating the heating period and also indicating when the metal elements have been sufficiently heated, thereupon automatically cutting off the current, applying the heated metal elements to the test strands for different periods to determine the proper length of the heating period, then clamping, winding and enclosing the strands from the remaining areas as previously described and heating and indicating the remaining metal elements as aforedescribed, then removing said metal elements successively from the heater device and clamping them onto the enclosed coils, indicating when the metal elements should be removed from the hair coils and successively removing them from said coils and replacing them in the same order in the heater device and then removing the pads to permit the hair coils to cool.

7. An electrical preheater comprising an obliquely disposed panel board with an upwardly-facing recess receiving a plurality of parallelly disposed rods, each enclosing an electrical resistance coil, said rods receiving a plurality of heaters with curved jaws to conform to the shape of a hair coil to be preheated and applied to the hair to cause waving, said rods applying heat to said heaters to be stored and expended when said heaters are applied to coils of hair to be waved.

8. An electrical preheater comprising an obliquely disposed panel board with an upwardly-facing recess receiving a plurality of parallelly disposed rods, each enclosing an electrical resistance coil, said rods receiving a plurality of heaters, each provided with two elongated partial cylindrical bulged jaw members consisting of a heat storing metal alloy, said jaw members being provided with heat insulated handle members and with a spring biasing said jaw members together, each of said heating rods including a cylindrical metal shell, a porcelain rod therein carrying a resistance coil and an insulating material between the coil and the shell.

9. An electrical preheater comprising an obliquely disposed panel board with an upwardly-facing recess receiving a plurality of parallelly disposed rods, each enclosing an electrical resistance coil, said rods receiving a plurality of heaters, each provided with two elongated partial cylindrical jaw members consisting of a heat storing metal alloy, said jaw members being provided with heat insulated handle members and with a spring biasing said jaw members together, the coil of each of said heating rods being electrically insulated from the shell, said coil being wound more closely adjacent the ends of the shell.

10. An electrical preheater comprising an obliquely disposed panel board with an upwardly-facing recess receiving a plurality of parallelly disposed rods, each enclosing an electrical resistance coil, said rods receiving a plurality of heaters, each provided with two elongated partial cylindrical jaw members consisting of a heat storing metal alloy, said jaw members being provided with heat insulated handle members and with a spring biasing said jaw members together, and signal means to indicate the heating period and another signal to indicate when said rods have been heated to proper temperature.

11. An electrical preheater comprising an obliquely disposed panel board with an upwardly-facing recess receiving a plurality of parallelly disposed rods, each enclosing an electrical resistance coil, said rods receiving a plurality of heaters, each provided with two elongated partial cylindrical jaw members consisting of a heat storing metal alloy, said jaw members being provided with heat insulated handle members and with a spring biasing said jaw members together, said rods being arranged in groups, one group being for test purposes and other groups being for the heating of the heaters to be successively applied to the hair during a permanent waving operation, and means for successively heating said groups.

12. An electrical preheater comprising an obliquely disposed panel board with an upwardly-facing recess receiving a plurality of parallelly disposed rods, each enclosing an electrical resistance coil, said rods receiving a plurality of heaters, each provided with two elongated partial cylindrical jaw members consisting of a heat storing metal alloy, said jaw members being provided with heat insulated handle members and with a spring biasing said jaw members together, said rods being arranged in groups, one group being for test purposes and other groups being for heating of the heaters to be successively applied to the hair during a permanent waving operation, and manual switch means to initiate supply of electrical energy to said rods to heat the same provided with a circuit arrangement to enable only one group to be heated at a time.

13. An electrical pre-heater for heaters to be used in permanent hair waving comprising a stand to be supported upon the floor, an obliquely disposed panel board carrying controls at the lower portion thereof and carrying at the upper portion thereof a plurality of elongated electrical resistance heater rods to receive the heaters, each including a metallic shell, a porcelain rod supported therewithin, a heating coil wound on said rod and an inert filler between said coil and said shell, means for supplying electrical current to said coil and means for automatically cutting off current to said coil when the heaters have been raised to a predetermined temperature, said rods being horizontally and parallelly disposed.

14. An electrical pre-heater for heaters to be used in permanent hair waving comprising a stand to be supported upon the floor, an obliquely disposed panel board carrying controls at the lower portion thereof and carrying at the upper portion thereof a plurality of resistance heated rods to cooperate with said heat storing and transferring heaters to be first placed on the rods and then on clamped coils of hair enclosed in pads, said rods being arranged in groups to be separately elevated to desired temperature, one group to receive test heaters and the other series to receive heaters to be used in the waving operation, said rods being horizontally and parallelly disposed.

15. An electrical pre-heater for heaters to be used in permanent hair waving comprising a stand to be supported upon the floor, an obliquely disposed panel board carrying controls at the lower portion thereof and carrying at the upper portion thereof a plurality of resistance heater elements to receive the heaters, a manual control to enable supply of current thereto, an automatic control to cut off the current when the heaters have been elevated to proper temperature and signals to indicate when the current is on and off.

16. An electrical pre-heater for preheating heaters to be used in permanent hair waving comprising a stand to be supported upon the floor, an obliquely disposed panel board carrying controls at the lower portion thereof and carrying at the upper portion thereof a plurality of resistance heater rod elements to receive the heaters, a manual control to enable supply of current thereto and an automatic control to cut off the current when the elements have been elevated to proper temperature, said heater elements being arranged so as to enable independent heating thereof, whereby separate elements may be successively raised to the desired elevated temperature.

17. An electrical pre-heater for preheating heaters to be used in permanent hair waving comprising a stand to be supported upon the floor, an obliquely disposed panel board carrying controls at the lower portion thereof and carrying at the upper portion thereof a plurality of resistance heater rod elements to receive the heaters, a manual control to enable supply of current thereto and an automatic control to cut off the current when the heaters have been elevated to proper temperature, and signals automatically actuated to indicate when the current is on and has been cut off.

18. A hair waving pre-heater comprising a stand, a panel construction carried by said stand adjacent the upper portion thereof, said panel carrying a plurality of heater receptors for said heaters to enable preheating of said heaters and a control board provided with manual means to permit energization of a receptor or selected group of receptors and preheating of the heaters thereby and also provided with means to indicate when the receptors are being energized and when the heaters have cooled.

19. A hair waving preheater for hair waving heaters comprising a stand, a panel construction carried by said stand adjacent the upper portion thereof, said panel carrying a plurality of heater receptors for said heaters to enable preheating of said heaters and a control board provided with manual means to permit energization of a receptor or selected group of receptors and preheating of the heaters thereby and also provided with means to indicate when the receptors are being energized and when the heaters have cooled, said heater receptors each including a rod with a metallic shell and electric heating resistance in said metallic shell and electrically insulated from said shell, the winding of said coil being closer at the ends of said rod than in the middle portion of said rod.

20. A hair waving pre-heater for hair waving heaters comprising a stand, a panel construction carried by said stand adjacent the upper portion thereof, said panel carrying a plurality of heater receptors for said heaters to enable preheating of said heaters and a control board provided with manual means to permit energization of a receptor or selected group of receptors and preheating of the heaters thereby and also provided with means to indicate when the receptors are being energized and when the heaters have cooled, said panel construction being obliquely disposed and being provided with a recess receiving said heater receptors and an insulating panel positioned behind said heater receptor and thermostatic and relay switch controls carried by said insulated panel.

21. An electrical apparatus for preheating heaters to be used for permanent hair waving comprising a plurality of heater receptors adapted to be contacted by said heaters, means to support said receptors, means to raise the temperature of said receptors so that the heaters which are in contact therewith will be raised to and maintained at a predetermined operative temperature for permanently waving hair on the human head, indicating means to show said heaters are approaching but have not yet reached said temperature, and indicating means to show said heaters are remaining at said temperature.

22. An electrical apparatus for preheating heaters to be used for permanent hair waving comprising a plurality of heater receptors adapted to be contacted by said heaters, means to support said receptors, means to raise the temperature of said receptors so that the heaters which are in contact therewith will be raised to and maintained within a predetermined operative temperature range for permanently waving hair on the human head, indicating means to show said heaters are approaching but have not yet reached said temperature range, and indicating means to show said heaters are remaining within said temperature range.

23. An electrical apparatus for preheating heaters to be used for permanent hair waving comprising a plurality of heater receptors adapted to be contacted by said heaters, means to support said receptors, means to optionally raise the temperature of selected receptors so that the heaters which are in contact therewith will be raised to and maintained within a predetermined operative temperature range for permanently waving hair on the human head, indicating means to show said heaters are approaching but have not yet reached said temperature range, and indicating means to show said heaters are remaining within said temperature range.

24. An electrical apparatus for preheating heaters to be used for permanent hair waving comprising a plurality of heater receptors adapted to be contacted by said heaters, means to support said receptors, means to optionally raise the temperature of selected receptors so that the heaters which are in contact therewith will be raised to and maintained within a predetermined operative temperature range for permanently waving hair on the human head, means to prevent heating of any receptors other than said selected receptors, indicating means to show said heaters are approaching but have not yet reached said temperature range, and indicating means to show said heaters are remaining within said temperature range.

25. An electrical apparatus for preheating heaters to be used for permanent hair waving comprising a plurality of heater receptors adapted to be contacted by said heaters, means to support said receptors, electrical heating means to raise the temperature of said receptors so that the heaters which are in contact therewith will be raised to and maintained within a predetermined operative temperature range for permanently waving hair on the human head, means to automatically render said heating means ineffective when said heaters have reached said temperature range, indicating means to show said heaters are approaching but have not yet reached said temperature range, and indicating means to show said heaters are remaining within said temperature range.

26. An electrical apparatus for preheating heaters to be used for permanent hair waving comprising a plurality of heater receptors adapted to be contacted by said heaters, means to support said receptors, electrical heating means including means to raise the temperature of said receptors so that the heaters which are in contact therewith will be raised to and temporarily maintained within a predetermined operative temperature range for permanently waving hair on the human head, means to automatically render said electrical heating means ineffective when said heaters have reached said temperature range, indicating means to show said heaters are approaching but have not yet reached said temperature range, and indicating means to show said heaters are remaining within said temperature range.

27. An electrical apparatus for preheating heaters to be used for permanent hair waving comprising a plurality of heater receptors adapted to be contacted by said heaters, means to support said receptors, heating means to raise the temperature of said receptors so that the heaters which are in contact therewith will be raised to a predetermined operative temperature range for permanently waving hair on the human head, means to automatically render said heating means ineffective when said heaters have reached said temperature range, additional heating means to heat said receptors after said first named heating means has been rendered ineffective so that the said heaters will be maintained within said temperature range, indicating means to show said heaters are approaching but have not yet reached said temperature range, and indicating means to show said heaters are remaining within said temperature range.

28. An electrical apparatus for preheating heaters to be used for permanent hair waving comprising a plurality of heater receptors adapted to be contacted by said heaters, said receptors having end portions and a portion intermediate said ends, said intermediate portion having an electrical resistance, said end portions having an electrical resistance which is greater per unit length than that of the resistance of said intermediate portion, means to support said receptors, means to raise the temperature of said receptors so that the heaters which are in contact therewith will be raised to and maintained within a predetermined operative temperature range for permanently waving hair on the human head, indicating means to show said heaters are approaching but have not yet reached said temperature range, and indicating means to show said heaters are remaining within said temperature range.

ALFRED EDMUND REIMERS.
GOTTHARD FREUDENBERG.